Sept. 1, 1959　　　W. T. WILLIAMS　　　2,901,804
QUICK RELEASE FASTENER

Filed Jan. 4, 1954　　　　　　　　　　　2 Sheets-Sheet 1

*INVENTOR.*
WILLIAM T. WILLIAMS
BY
*William R. Lane*
ATTORNEY

United States Patent Office 2,901,804
Patented Sept. 1, 1959

2,901,804

QUICK RELEASE FASTENER

William T. Williams, Long Beach, Calif., assignor to North American Aviation, Inc.

Application January 4, 1954, Serial No. 401,944

10 Claims. (Cl. 24—211)

This invention relates to fasteners and more particularly to a quickly releasable fastener capable of carrying structural loads.

Although there are quick release fasteners presently in existence none of these can be considered satisfactory for use as structural members. In the main, these present fasteners are usable only for non-structural access doors, cowling panels, wall partitions and the like. Where these fasteners are installed to take significant structural loads it is found that these loads are accompanied by deflections in the fasteners.

Many instances occur where structural panels must be readily removable. In the case of a skin or shell, as of an airframe or pressure vessel, which is adapted to carry substantial structural loads it may be necessary to provide an easily and quickly removable access door or the like. It is obvious that the fasteners for holding such load-carrying door must not only be readily releasable but must also be capable of carrying substantial structural loads, especially in shear, without accompanying deformation.

This invention contemplates the provision of a quickly releasable fastener which is capable of carrying substantial structural loads.

It is therefore an object of this invention to provide a fastener which is quickly fastenable and releasable.

It is another object of this invention to provide a fastener which is simply fastenable and releasable.

It is still another object of this invention to provide a quick release fastener capable of carrying structural loads.

It is yet another object of this invention to provide a quick release fastener that has high shear strength.

It is a further object of this invention to provide a quick release fastener that is simply and economically constructed.

Other objects and advantages will become apparent from the following description taken in connection with the accompanying drawings, in which.

Figure 1:
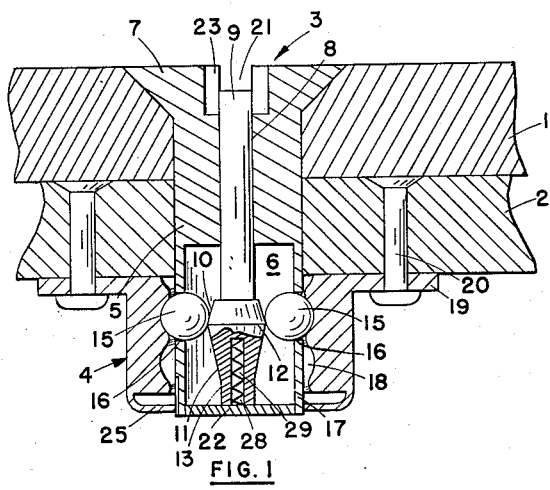
Fig. 1 is a longitudinal sectional view of the fastener of this invention holding two plates together.

In detail, referring to Fig. 1, two plates 1 and 2 are shown held together by the fastener of this invention which generally comprises a stud or bolt 3 and a receptacle or nut 4. Bolt 3 is formed with shank 5 having a concentric recess or bore 6 formed in one end thereof and any convenient abutting means such as head 7 integral with the other end thereof. Central, small-diameter through-bore 8 is formed through head 7 and shank 5 and opens into recess 6. Mounted for reciprocation within through-bore 8 is actuating link or pin 9 having at its lower end, within recess 6, opposed, tapered, cam-surfaced sections 10, 11. The surfaces of these sections will be seen to meet at a common portion defining a line 12 of maximum diameter.

Figure 2:
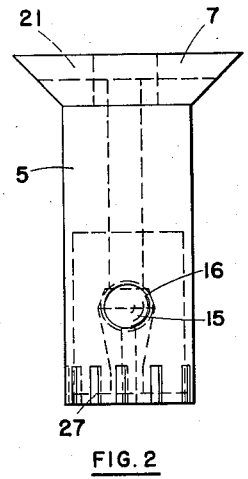
Fig. 2 is a side elevational view of the bolt rotated 90° from that shown in Fig. 1.

Fig. 1 shows the surface of cam section 10 in contact with projection means or movable detents taking the shape of balls 15 in this modification which are thereby forced outwardly of recess 6 through apertures 16 in the wall 17 of shank 5 into holding contact with complementarily formed grooves or threads 18 formed internally of nut 4. As seen in Fig. 2 apertures 16 may be formed of slightly smaller diameter than balls 15 so that said balls will be retained within recess 6. Nut 4 may be conveniently attached to plate 2 as by flanges 19 and rivets 20. Also, head 7 may be slotted as at 21 to adapt bolt 3 for driving with a conventional screwdriver.

Figure 3:
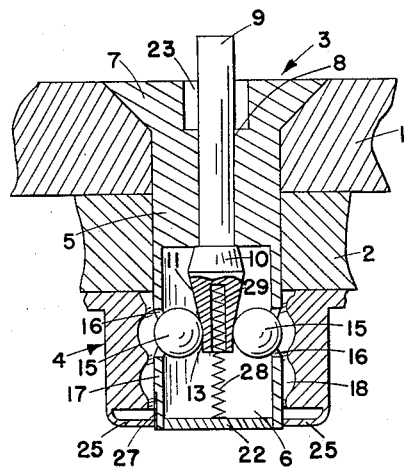
Fig. 3 is a view similar to Fig. 1 but in which the bolt is in the release position.

Fig. 3 shows the fastener in the released position in which pin 9 has been withdrawn so as to allow balls 15 to collapse inwardly of wall 17 and facilitate the withdrawal of bolt 3. The only operation necessary to secure bolt 3 in holding relationship with nut 4 is to drive pin 9 downwardly by forcing a conventional screwdriver into slot 21. The downward movement of pin 9 causes the surface on cam section 11 to force the balls 15 outwardly to the projecting position shown in Fig. 1. Plug 22 should be press fitted into the open end of recess 6 to provide a stop for pin 9 at the point where line 12 has just passed a line joining the centers of balls 15. In this manner pin 9 will be locked positively in the position shown in Fig. 1 until such time as some external force is applied to it. A short twist of the screwdriver will serve to tighten plates 1 and 2 together due to the threading action of balls 15 in threads 18. Release of the fastener of this invention is accomplished simply by withdrawing pin 9 to the position shown in Fig. 3 by the application of a pair of pliers or the like. Head 7 may be recessed as at 23 to allow such access to the upper end of pin 9.

Figure 4:
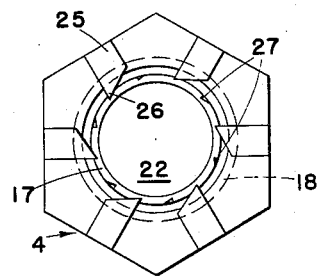
Fig. 4 is a bottom plan view of the fastener of Fig. 1.

In order to prevent the rotation of bolt 3 so that it will not loosen under vibration, tabs 25 are provided on the underside of bolt 4 (Figs. 1, 3, 4). Tabs or dogs 25 are seen to be formed with points 26 adapted to engage serrations 27, formed in the lower end of wall 17, to prevent such rotation. It will be noted that tabs 25 do not hinder the insertion or withdrawal of bolt 3 from nut 4.

In order that pin 9 be held in the upper position shown in Fig. 3, when bolt 3 is in condition to be released, coil spring 28 may be provided tending to force pin 9 upwardly. Since pin 9 contacts plug 22 when in the position shown in Figs. 1, 2 a hole 29 in cam section 11 should be provided for receiving one end of spring 28; the other end of spring 28 bears on plug 22. The strength of spring 28 should be sufficient only to hold pin 9 in the position shown in Fig. 3 and not sufficient to force pin 9 upwardly from the position shown in Fig. 1. It will also be noted that the lower extension 13 of pin 9 acts to prevent balls 15 from falling into recess 6 out of apertures 16.

Figure 5:
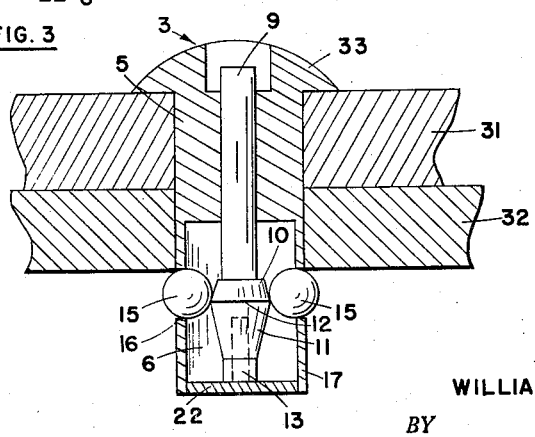
Fig. 5 is a longitudinal sectional view of the bolt of this invention alone holding two plates together.

Fig. 5 shows a modification of the fastener of this invention for use where bolt 3 may be tailored to fit the thickness of plates 31 and 32. Bolt 3 may be formed with a buttonhead 33 while the other details are similar to those shown in Fig. 1 and similarly referenced. However, instead of balls 15 contacting threads 18 in nut 4, where the thickness of plates 31 and 32 are standardized, balls 15 perform their restraining function by being in contact with the under edge of plate 32. The insertion and withdrawal of bolt 3 is similar to that described except that no twisting need be applied to tighten the plates together. Bolt 3, in this instance, could as well be driven by a hammer or the like.

Figure 6:
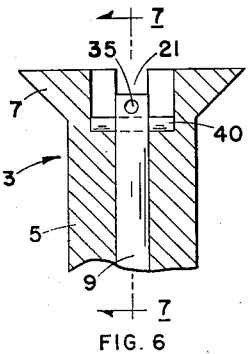
Fig. 6 is a longitudinal sectional view of a portion of the bolt of Fig. 1 showing a modification of the actuating pin thereof.
Figure 7:
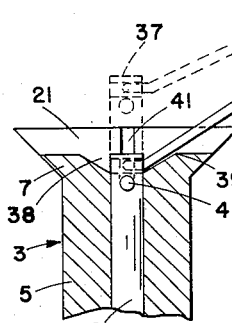
Fig. 7 is a longitudinal sectional view taken along line 7—7 of Fig. 6 and showing a tool suitable for releasing the fastener.

Figs. 6, 7 show a slight modification of the actuating pin 9 of bolt 3 consisting of an aperture 35 formed in the upper end of said pin. Into this aperture any sharp-ended tool 36 is adapted to be inserted to facilitate withdrawal of pin 9 to the dotted position 37 shown in Fig. 7. Head 7 may also be slotted, as previously described, and can be further recessed as at 38 to provide fulcrum point 39 so that tool 36 may act as a lever, moving in the direction shown by the arrow in Fig. 7, for withdrawing pin 9. In order that aperture 35 remain correctly oriented for the insertion of tool 36, pin guide 40 is provided to ride in guide slot 41 formed in head 7.

Figure 8:
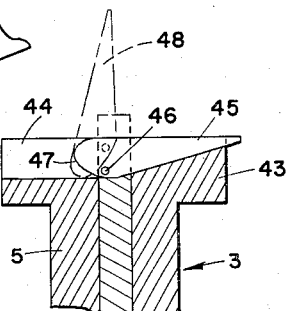
Fig. 8 is a partial longitudinal sectional view of a modified form of the bolt shown in Fig. 1 showing a releasing device.

A further modification providing a release mechanism for bolt 3 is shown in Fig. 8 in which bolt 3 has square or hexagonal, wrench-actuatable head 43. Head 43 and pin 9 are slotted as at 44 to receive cam lever 45. Lever 45 is pivotally connected to actuating pin 9 by pivot pin 46 and is provided with eccentric cam surface 47 adapted to bear on head 43 at the bottom of slot 44. In the solid line position shown in Fig. 8, pin 9 is depressed to the locking position shown in Fig. 1. Upon lifting lever 45 to move it to the dot-dash line position 48 (shown in Fig. 8), the action of cam surface 47 on the bottom of slot 44 operates to raise or withdraw pin 9 and thereby unlock the fastener in the manner previously described.

Figure 9:
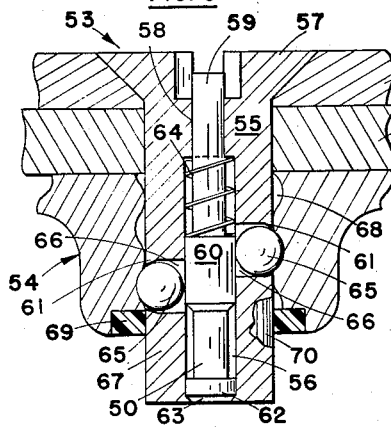
Fig. 9 is a longitudinal sectional view of a modified form of fastener.

The modified fastener of Fig. 9 is similar to that of Fig. 1 and comprises stud or bolt 53 and receptacle or nut 54 shown in fastening relationship with plates 51 and 52. Bolt 53 is formed with shank 55 having concentric recess 56 and head 57. Bore 58, formed through head 57 and shank 55 and opening into recess 56, retains pin 59 therein. Pin 59 has upset or enlarged portion 60, of substantially the same diameter as recess 56, in contact with a plurality of movable projections or balls 65 shown forced outwardly of recess 56, through apertures 66 in wall 67 of shank 55, into holding relationship with threads 68 of nut 54. Walls 67 may be peened over as at 61 in order to retain balls 65 partially within recess 56. Pin 59 is circumferentially relieved below portion 60, as at 50, and may be formed at its lower end with flange 62, of substantially the same diameter as recess 56; said recess should be partially closed, as at 63, to retain pin 59 therein.

The operation of the fastener of Fig. 9 is substantially the same as that described for the fastener of Fig. 1; the depression of pin 59 causes balls 65 to ride up on portion 60 and be forced into the fastening position shown. Upon withdrawal of pin 59 so that relieved portion 50 is adjacent balls 65, said balls are free to retract into recess 56 and bolt 53 is then free to be withdrawn from nut 54.

Enlarged portion 60 is shown to be of constant diameter and axially extended to be in forceable contact with all of balls 65, two of which are shown axially offset by one-half the pitch diameter of threads 68. It is obvious that any number of balls 65 may be provided consonant with the physical limitations of bolt 53. Since portion 60 has no line of maximum diameter such as line 12 (Fig. 1) to form a positive lock, helical compression spring 64 may be provided to retain pin 59 in the depressed position shown in Fig. 9 against vibratory or unintentional loosening of bolt 53. The strength of spring 64 should be sufficient only to lightly hold pin 59 in the depressed position shown in Fig. 9 and not such as to force said pin from a raised position to such depressed position.

An alternate method of preventing rotation of bolt 53 so that it will not loosen under vibration is shown in Fig. 9 to comprise elastic locking ring 69 of fiber or the like built into nut 54. Ring 69 is adapted to engage serrations 70 on shank 55 so as to prevent inadvertent rotation of bolt 53, but not to hinder withdrawal or insertion thereof. It is obvious that other methods of preventing rotation of bolt 53 may be employed such as the use of a split nut or the like.

In the modified fastener of Figs. 10 through 13, bolt 73 is shown similar to that previously described having shank 75, bore 76, head 77, small bore 78, and actuating pin 79 with enlarged portion 80, relieved portion 81 and flange 82. Bolt 73 is shown in holding relationship, in Fig. 10, with plates 71, 72 and nut 74 having internal threads 88. In place of balls 15, 65 (Figs. 1, 9) bolt 73 is provided with projections in the form of helical coil sections or spring elements 85 shown in Fig. 10 in contact with threads 88. In the non-fastening position shown in Figs. 11, 13, projection means or movable detents in the form of elements 85 reside in circumferential helical recess 83 formed in shank 75. Elements 85 are formed with inwardly directed ends 86 which extend through apertures 84, communicating between the bottom of recess 83 and bore 76, into bore 76.

Figure 10:
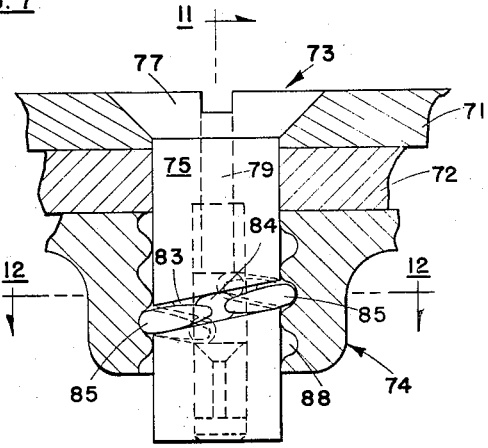
Fig. 10 is a longitudinal sectional view similar to Figs. 1 and 9 showing a further modification of the fastener of this invention in holding or fastening relationship.
Figure 11:
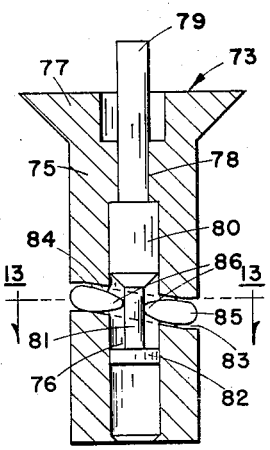
Fig. 11 is a longitudinal sectional view of the bolt alone taken along line 11—11 of Fig. 10 showing the spring elements in the collapsed or non-holding position.
Figure 12:
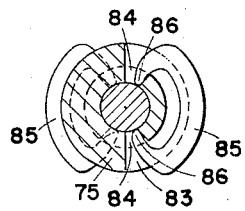
Fig. 12 is a cross-sectional view of the bolt alone taken along line 12—12 of Fig. 10.
Figure 13:
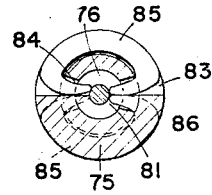
Fig. 13 is a cross-sectional view taken along line 13—13 of Fig. 11.

In operation, as pin 79 is depressed so as to wedge portion 80 between ends 86 of elements 85, portion 80 performs the dual function of spreading ends 86 of each element 85 apart and forcing the major portions of elements 85 into the expanded or fastening position shown in Figs. 10, 12. Once pin 79 is withdrawn to the position shown in Fig. 11 elements 85 will collapse, due to their resiliency, to the recessed position shown in Figs. 11, 13 allowing bolt 73 to be readily withdrawn.

One of the additional advantages to be gained by the modified fastener shown in Figs. 10 through 13 is that the contact area between bolt 73 and nut 74 is increased so as to increase the tension load that bolt 73 can withstand without decreasing its quick-release features. In this regard it can be seen that the cross-section of elements 85 may be other than round (as shown), perhaps square or triangular, to more nearly approach the holding power of a conventional threaded bolt. Furthermore, once spring elements 85 have been snapped in place their ends 86 will continue to be held in apertures 84 against accidental removal by the resiliency of said elements.

It will be obvious that any number of elements 85 may be used depending on the load capacity required of bolt 73. It will also be noted that the bolt of Figs. 10 through 13 is capable of being used without a nut, as is the bolt of Fig. 5, and in such case recess 83 need not be helical.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A quickly releasable fastener capable of carrying structural loads comprising a bolt including a head, a shank integral with said head, projection means movable from a non-fastening position substantially recessed within said shank to a fastening position extending substantially outwardly of said shank, said threads comprised of a plurality of loosely held balls, and an actuating pin operable externally of said head, mounted for reciprocation within said shank, and having a portion for moving said threads to said fastening position when said pin is depressed to wedge said portion between said threads and a nut having a bore threaded complementarily to said threads for receiving a portion of said shank including said threads when said threads are in said fastening position and including means for preventing the rotation of said bolt when said threads are so received in said nut.

2. A quickly releasable fastener capable of carrying structural loads comprising a bolt including a shank having serrations thereon, projection means movable from a non-fastening position substantially recessed within said shank to a fastening position extending substantially outwardly of said shank, and an actuating pin operable externally of said bolt, mounted for reciprocation within said shank, and having a cam portion for moving said projection means to said fastening position when said pin is depressed to wedge said portion between said projection means, and a nut having a bore threaded complementarily to said projection means for receiving a portion of said shank including said projection means when said projection means are in said fastening position, said bolt being rotatable in said nut for tightening said bolt to said nut when said projection means are in said fastening position and dogs on said nut engageable with said serrations for preventing accidental rotation of said bolt.

3. A quickly releasable fastener capable of carrying structural loads comprising a stud having a shank, projection means movable from a non-fastening position substantially recessed within said shank to a fastening position extending substantially outwardly of said shank, an actuating pin operable externally of said stud, mounted for reciprocation within said shank, and having an upset portion for moving said projection means to said fastening position when said pin is depressed to wedge said portion between said projection means, spring means surrounding and tending to depress said pin, and a nut having a bore threaded complementarily to said projection means for receiving a portion of said shank including said projection means when said projection means are in said fastening position, said shank being rotatable in said nut for tightening said shank to said nut when said projection means are in said fastening position.

4. A quickly releasable fastener adapted to carry structural loads comprising a bolt, including a head, a shank integral with said head and having a central bore, detents movably mounted within said bore from a non-fastening position wholly within the exterior surface of said shank to a fastening position extending partially outwardly of said surface, and an actuating link operable externally of said head, mounted for reciprocation within said shank, and having, in contact with said detents, opposed tapered surfaces meeting at a common portion defining a line of maximum diameter for moving said detents to, and locking said detents in said fastening position when said link is depressed sufficiently to translate said common line past a line joining the centers of said detents whereby said detents are free to move to said non-fastening positions when said link is withdrawn, and a nut having a bore threaded complementarily to said detents for receiving a portion of said shank including said detents when said detents are in said fastening position, said bolt being rotatable in said nut for tightening said bolt to said nut when said detents are in said fastening position and said nut having locking means for preventing the rotation of said bolt when said detents are so received in said nut, said actuating link being operable to move said detents from said fastening position to said non-fastening position while said locking means is preventing rotation of said bolt.

5. A quickly releasable fastener comprising a stud and a receptacle, said stud including a cylindrical body having a head at one end, a relatively large-diameter, coaxial recess opening outwardly of the other end thereof and forming a cylindrical wall between the exterior surface of said body and the interior surface of said recess, a relatively small-diameter central through-bore connecting the bottom of said recess with said one end, said cylindrical wall being formed with apertures, balls of substantially larger diameter than the thickness of said wall mounted in said apertures for movement from a non-fastening position substantially within the cylindrical exterior surface of said body to a fastening position extending substantially outwardly of said surface, and a reciprocable actuating pin having a small-diameter first portion mounted in said through-bore and accessible from said one end and a second portion of substantially the same diameter as said recess for forcing said balls to said fastening position when said second portion is wedged between said balls, said receptacle having a cylindrical bore for receiving said other end of said body and further having internal circumferential grooves for receiving said balls when said balls are in said fastening position, said body being rotatable in said receptacle for tightening said body to said receptacle when said balls are in said fastening position, locking means in said receptacle for preventing the rotation of said body when said balls are so received in said grooves, said actuating pin being operable to collapse said balls from said fastening position to said non-fastening position while said locking means is preventing rotation of said body, whereby when said second portion is not wedged between said balls, said balls are allowed to collapse to said non-fastening position and said stud is capable of being readily withdrawn from said receptacle.

6. A quickly releasable stud comprising a cylindrical shank having abutting means at one end, a longitudinal bore, an outwardly opening helical recess disposed circumferentially of said shank, said shank being formed with openings communicating between said bore and said recess, an actuating pin having an enlarged portion mounted for reciprocation in said bore, coil spring sections in a non-fastening position residing substantially within said recess and having bent ends extending through said apertures into said bore whereby when said enlarged portion of said pin is wedged between said bent ends said spring sections are forced to a fastening position extending substantially outwardly of said shank, and a receptacle for receiving the other end of said shank, said receptacle having internal circumferential threads for receiving said spring sections when said spring sections are in said fastening position, said shank being rotatable in said receptacle for tightening said shank to said receptacle when said spring sections are in said fastening position, locking means in said receptacle for preventing rotation of said shank when said spring sections are so received in said threads, said actuating pin being operable to unfasten said spring sections while said locking means is preventing rotation of said shank.

7. A quickly releasable fastener capable of carrying structural loads comprising a bolt including a shank, projection means adapted to move from a non-fastening position, substantially recessed within said shank, to a fastening position projecting substantially outwardly of said shank, actuating means within said shank movable between a first and a second position, said actuating means being adapted for moving said projection means from said non-fastening position to said fastening position when said actuating means are moved from said first position to said second position and vice versa, and a nut having a bore threaded complementary to said projection means for receiving a portion of said shank including said projection means, said shank being rotatable within said nut for tightening said nut when said projection means are in said fastening position, said actuating means being movable to said first position while the bolt is in the tightened position, whereby the projection means may return to said non-fastening position and the bolt may be removed from said bore without requiring rotation.

8. A quickly releasable fastener capable of carrying structural loads comprising a bolt including a shank, projection means movable from a non-fastening position, substantially recessed within said shank, to a fastening position extending substantially outwardly of said shank, an actuating member movably mounted within said shank between a first and a second position, said actuating member having a cam portion means for moving said projection means to said fastening position when said member is moved from said first position to said second position and vice versa, and a nut having a bore threaded complementary to said projection means for receiving a portion of said shank including said projection means, said shank being rotatable within said nut for tightening said nut when said projection means are in said fastening position, said actuating member being able to be moved to its first position while the bolt is in the tightened position, whereby the projection means may return to said non-fastening position and the bolt may be removed from said bore without requiring rotation.

9. A quickly releasable fastener capable of carrying structural loads comprising a bolt including a shank, detents movably mounted within said shank from a non-fastening position substantially recessed within said shank to a fastening position extending substantially outwardly of said shank, an actuating pin operable externally of said bolt, mounted for reciprocation within said shank, said pin having a cam surface for moving said detents to said fastening position when said pin is depressed to wedge said surface between said detents, and a nut having a bore threaded complementary to said detents for receiving a portion of said shank including said detents when said detents are in said fastening position, said shank being rotatable in said nut for tightening said bolt to said nut when said detents are in said fastening position, said actuating pin being movable upwardly while the bolt is in the tightened position, whereby the detents may return to said non-fastening position and the bolt may be removed from said bore without requiring rotation.

10. A quickly releasable fastener capable of carrying structural loads comprising a bolt including a shank having serrations thereon, projection means movable from a non-fastening position substantially recessed within said shank to a fastening position extending substantially outwardly of said shank, actuating means movably mounted within said shank between a first and a second position, said actuating means having a cam portion for moving said projection means to said fastening position when said pin is moved from said first position to said second position, and a nut having a bore threaded complementary to said projection means for receiving a portion of said shank including said projection means, said shank being rotatable in a first direction within said nut for tightening said nut when said projection means are in said fastening position, and dogs on said nut engageable with said serrations for positively prohibiting rotation of the bolt in a direction opposite to said first direction.

References Cited in the file of this patent

UNITED STATES PATENTS

| | | |
|---|---|---|
| 589,813 | Campbell | Sept. 14, 1897 |
| 1,069,451 | Marston | Aug. 5, 1913 |
| 1,106,159 | Rawlins | Aug. 4, 1914 |
| 1,456,555 | Hubbell | May 29, 1923 |
| 2,373,083 | Brewster | Apr. 3, 1945 |
| 2,422,304 | Johnson | June 17, 1947 |
| 2,472,651 | Diaper | June 7, 1949 |
| 2,477,178 | Hallock | July 26, 1949 |
| 2,480,662 | McKinzie | Aug. 30, 1949 |

FOREIGN PATENTS

| | | |
|---|---|---|
| 542,028 | Great Britain | Dec. 23, 1941 |
| 553,956 | Great Britain | June 11, 1943 |